US012147329B2

(12) United States Patent
Rimon et al.

(10) Patent No.: US 12,147,329 B2
(45) Date of Patent: Nov. 19, 2024

(54) UNIFORM PROCESS FOR GENERATING MULTIPLE OUTPUTS WITH COMMON SECTION IN PSEUDO-RANDOM SOFTWARE SYSTEM

(71) Applicant: International Business Machines Corporation, Armonk, NY (US)

(72) Inventors: Michal Rimon, Nofit (IL); Avishai Moshe Fedida, Gesher Ha'Ziv (IL); Oz Dov Hershkovitz, Zichron Yaacov (IL); Ofek Gutman, Haifa (IL)

(73) Assignee: International Business Machines Corporation, Armonk, NY (US)

( * ) Notice: Subject to any disclaimer, the term of this patent is extended or adjusted under 35 U.S.C. 154(b) by 102 days.

(21) Appl. No.: 18/059,061

(22) Filed: Nov. 28, 2022

(65) Prior Publication Data

US 2024/0176729 A1    May 30, 2024

(51) Int. Cl.
*G06F 11/36* (2006.01)
(52) U.S. Cl.
CPC .................. *G06F 11/3684* (2013.01)
(58) Field of Classification Search
CPC ............. G06F 11/3684; G06F 11/3672; G06F 11/3676; G06F 11/368; G06F 11/3688; G06F 11/3692; G06F 11/3696
See application file for complete search history.

(56) References Cited

U.S. PATENT DOCUMENTS

| | | | | |
|---|---|---|---|---|
| 5,548,718 A * | 8/1996 | Siegel | .................. | G06F 11/3676 714/45 |
| 5,956,478 A * | 9/1999 | Huggins | ........ | G01R 31/318307 714/33 |
| 6,567,924 B1 * | 5/2003 | McGee | ............... | G06F 11/3688 713/502 |
| 10,061,672 B2 * | 8/2018 | Dagan | .................... | G06F 11/263 |
| 11,163,661 B2 * | 11/2021 | Kadiyala | ............... | G06F 11/273 |
| 11,567,857 B1 * | 1/2023 | Arora | .................. | G06F 11/3684 |
| 2004/0199815 A1 * | 10/2004 | Dinker | ................ | G06F 11/3495 714/21 |

(Continued)

OTHER PUBLICATIONS

Kangjie Lu et al., "How to Make ASLR Win the Clone Wars: Runtime Re-Randomization," Institute for Information Security & Privacy Cybersecurity Lecture Series, Dated: Feb. 12, 2016, pp. 1-15.

(Continued)

*Primary Examiner* — Joseph O Schell
(74) *Attorney, Agent, or Firm* — Patterson + Sheridan, LLP (57) ABSTRACT

Embodiments of the present disclosure are directed to an efficient and uniform process for generating multiple outputs for different generated test cases for an input request that share a common section in a pseudo-random software system. An enhanced disclosed method comprises processing an input request and a sequence of instructions until a state or condition of interest is reached in a first process. The condition of interest is marked as a split point in the first process. At the split point, a next process for generating multiple outputs is created to include a common section of the first process from the input request to the split point, an added form of randomization, and at least one instruction after the split point. The common section is generated only once in the first process, which can provide significantly enhanced performance.

20 Claims, 8 Drawing Sheets

(56) References Cited

U.S. PATENT DOCUMENTS

| | | | |
|---|---|---|---|
| 2007/0067687 A1* | 3/2007 | Ong | G11C 29/56012 |
| | | | 714/731 |
| 2009/0132222 A1* | 5/2009 | Hong | G06F 11/3684 |
| | | | 703/20 |
| 2011/0138229 A1* | 6/2011 | Alberi | G06F 11/3672 |
| | | | 714/E11.207 |
| 2014/0257739 A1* | 9/2014 | Dagan | G06F 11/2236 |
| | | | 702/123 |
| 2014/0331204 A1* | 11/2014 | Godefroid | G06F 11/3688 |
| | | | 717/124 |
| 2018/0217859 A1 | 8/2018 | Triplett | |
| 2022/0123930 A1 | 4/2022 | Sultana et al. | |

OTHER PUBLICATIONS

Jack Wadden et al., "Generating Efficient and High-Quality Pseudo-Random Behavior on Automata Processors," 2016 IEEE 34th International Conference on Computer Design (ICCD), Dated: Oct. 5, 2016, pp. 1-8.

* cited by examiner

100

COMPUTER 101

PROCESSOR SET 110

PROCESSING CIRCUITRY 120 | CACHE 121

COMMUNICATION FABRIC 111

VOLATILE MEMORY 112

PERSISTENT STORAGE 113

OPERATING SYSTEM 122

MULTIPLE OUTPUT GENERATION COMPONENT 182

SPLIT_PROCESS INTERFACE COMPONENT 184

180

PERIPHERAL DEVICE SET 114

UI DEVICE SET 123 | STORAGE 124 | IoT SENSOR SET 125

NETWORK MODULE 115

WAN 102

END USER DEVICE 103

REMOTE SERVER 104

REMOTE DATABASE 130

PRIVATE CLOUD 106

GATEWAY 140

PUBLIC CLOUD 105

CLOUD ORCHESTRATION MODULE 141 | HOST PHYSICAL MACHINE SET 142

VIRTUAL MACHINE SET 143 | CONTAINER SET 144

SplitTest - Expression description 400

SplitTest(*numberOfTestsToCreate*) 402

*numberOfTestsToCreate* (integer) - Specifies the number of tests

When called, split the current generation into *numberOfTestsToCreate generations*, such that all the tests are identical up to the splitting point and vary after the split.

Def: 702

```
iter=0
while (iter<2)
  If (iter==o)
    Common code
  else
    SplitTest(N)
    Some additional code
```

700

704

- Assuming we harvested an interesting test (the entire test or part of it).
- Create a variant of the respective def file:
  - Wrap the interesting part with a Repeat times = 2
  - The 1st iteration of the Repeat should behave like the original def
  - On the 2nd iteration add SplitTest(N)
    - in case that the Repeat wraps the entire test follow the split with more content
- Generating again with the original seed will result in N interesting tests

UNIFORM PROCESS FOR GENERATING MULTIPLE OUTPUTS WITH COMMON SECTION IN PSEUDO-RANDOM SOFTWARE SYSTEM

BACKGROUND

The present invention relates to the data processing field, and more specifically, to a system and methods for generating multiple outputs for an input request that share a common section in a pseudo-random software system.

In pseudo-random software systems such as software test systems, it is often of interest to generate multiple outputs for a same input request, and possible to generate multiple outputs that share common sections. Such systems are usually characterized by making pseudo-random decisions, where the multiple outputs are obtained by making different random decisions while starting from the same input request. In existing systems, typically the multiple outputs are generated by repeating the entire computation process per output starting at the input request.

As such, a significant problem exists for such existing pseudo-random software systems. This problem results because each of the multiple processes is required to perform the entire process including common initial computations for each process generating one of the multiple outputs for the same input request. In conventional systems, each process generating an output starts at an input request and performs computations that can require a large computation time to reach a point of interest. The computations to reach the point of interest are repeated by each process generating an output of the multiple outputs. For example in a pseudo-random software system such as processor verification test generation software system, a test case generator can spend significant computation time to reach a state or condition of interest, such as a micro-architectural state. Once reached, this interesting state or condition needs to be explored in different ways, requiring generation of multiple outputs. Current techniques use multiple processes to generate multiple outputs, with each process spending the same large computation effort to reach this micro-architectural state of interest. After reaching the interesting micro-architectural state, each process must process respective different instructions for each output explored. That is, current systems must spend significant computation effort to reach a point or state of interest that must be repeated for each of multiple processes to provide a respective different process output, which can be very inefficient. New techniques are needed for efficiently generating multiple outputs from an initial state or condition that overcome deficiencies of current systems.

SUMMARY

Embodiments of the present disclosure are directed to an efficient and uniform process for generating multiple outputs for different generated results or cases for an input request that share a common section in a pseudo-random software system. A non-limiting example computer-implemented method comprises processing an input request and a sequence of instructions or operations until a state or condition of interest is reached in a first process. The condition of interest is marked as a split point in the first process. At the split point, a next process is created for generating a test case including a common section of the first process from the input request to the split point, an added form of randomization, and at least one instruction after the split point. The method continues with creating processes to provide a requested number of processes for the multiple outputs for different generated cases. The common section is generated only once in the first process, whereby this method can provide significantly enhanced performance. This method does not require computation time for separately processing the shared common section by each process generating a respective multiple output for different generated cases.

This method is independent of the architecture of an underlying pseudo-random software system, such as a pseudo-random test system generating test cases or a pseudo-random software planning system generating result or product cases, where the pseudo-random software system has an operating system capable of duplicating an existing process. Each respective generated test case can be used for various testing applications, such as hardware simulation, verification and testing applications. In pseudo-random software planning and product systems, each respective generated process output can be used for various planning and product applications, such as to provide a mapping plan generating multiple routes between different physical locations.

In accordance with disclosed embodiments, another non-limiting computer implemented test method comprises generating at least two different outputs for different generated test cases, which originate from a common input. A predefined state or condition is received for a split point in a test case generation parent process. When the predefined condition is identified in the test case generation parent process, the predefined condition is marked as the split point, a randomizer state is changed and a child process is generated including the common section from the input request up to the split point of the parent process. After the split point, the child process includes a different computation path from the parent process. The child process generation runs or continues to completion for generating and saving one of the respective different outputs of multiple generated cases. A respective different output of multiple generated outputs can be saved by the child process before generating another child process. Multiple different child processes can be generated in parallel for generating the multiple different test cases. This method is capable of reacting dynamically to a request (either internal or from test environment interface) to create a diversion in the process or program flow from a common section.

In accordance with disclosed embodiments, another non-limiting computer implemented method comprises generating at least two different outputs for different generated test cases which originate from a common input. A sequence of instructions defined by one or more user requests is generated and processed to identify a predefined state or condition in a first process. The user specifies a command TestSplit (M) or RunSplit(M) marking a split point for the identified state or condition, and a set of instructions after the split point. At the split point, M different test cases or M different process cases are generated; each includes a common section of the sequence of instructions that are identical up to the split point in the first process, with each test case or process case having added randomization and a different set of the instructions that follow the split point. The common section is generated only once in the first process, and used for all test cases hence providing a significant efficiency improvement.

DETAILED DESCRIPTION

Existing pseudo-random software systems can be very inefficient at generating multiple outputs where the multiple outputs are obtained by making different random decisions while starting from the same input request. In existing systems, typically the multiple outputs are generated by performing the entire computation process per output starting at the input request. A problem of existing systems is that each of the multiple processes is required to perform common initial computations that are the same for each process, for example, a large computation time must be repeated to generate each of the multiple outputs.

Embodiments of the present disclosure provide new effective techniques enabling accurate and effective generation of the multiple outputs for the same input request, significantly reducing the computation time of the disclosed processes for generating multiple outputs and avoiding some deficiencies of current systems. In one embodiment, a disclosed method receives an input request that is processed until a state or condition of interest is reached and the condition of interest is marked as a split point in the process. At the split point, a next process is created to include a common section of the first process from the input request to the split point, an added form of randomization, and at least one instruction after the split point. The method continues with the creating processes to provide a requested number of processes for the multiple outputs for different generated test cases. In the disclosed method the common section is generated only once (in the first process). This method provides enhanced efficiency eliminating the required computation time for separately processing the shared common section by each process for a respective output of current techniques. This method is independent of the architecture of an underlying pseudo-random software system generating test cases, where the pseudo-random software system has an operating system capable of duplicating an existing process.

Embodiments of the present disclosure provide enhanced new techniques to efficiently generate multiple outputs from an initial state or condition that overcome some deficiencies of current systems. Multiple test processes for multiple different outputs are generated using a common section of code for each test process where the multiple outputs are obtained by making different random decisions while starting from the same input request. In the generation of multiple test processes, the common section of code used for each test process is generated only once when an input request is processed to identify a state or condition of interest. This identified state or condition of interest provides a split point for generating multiple test processes.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

In the following, reference is made to embodiments presented in this disclosure. However, the scope of the present disclosure is not limited to specific described embodiments. Instead, any combination of the following features and elements, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Figure 1:
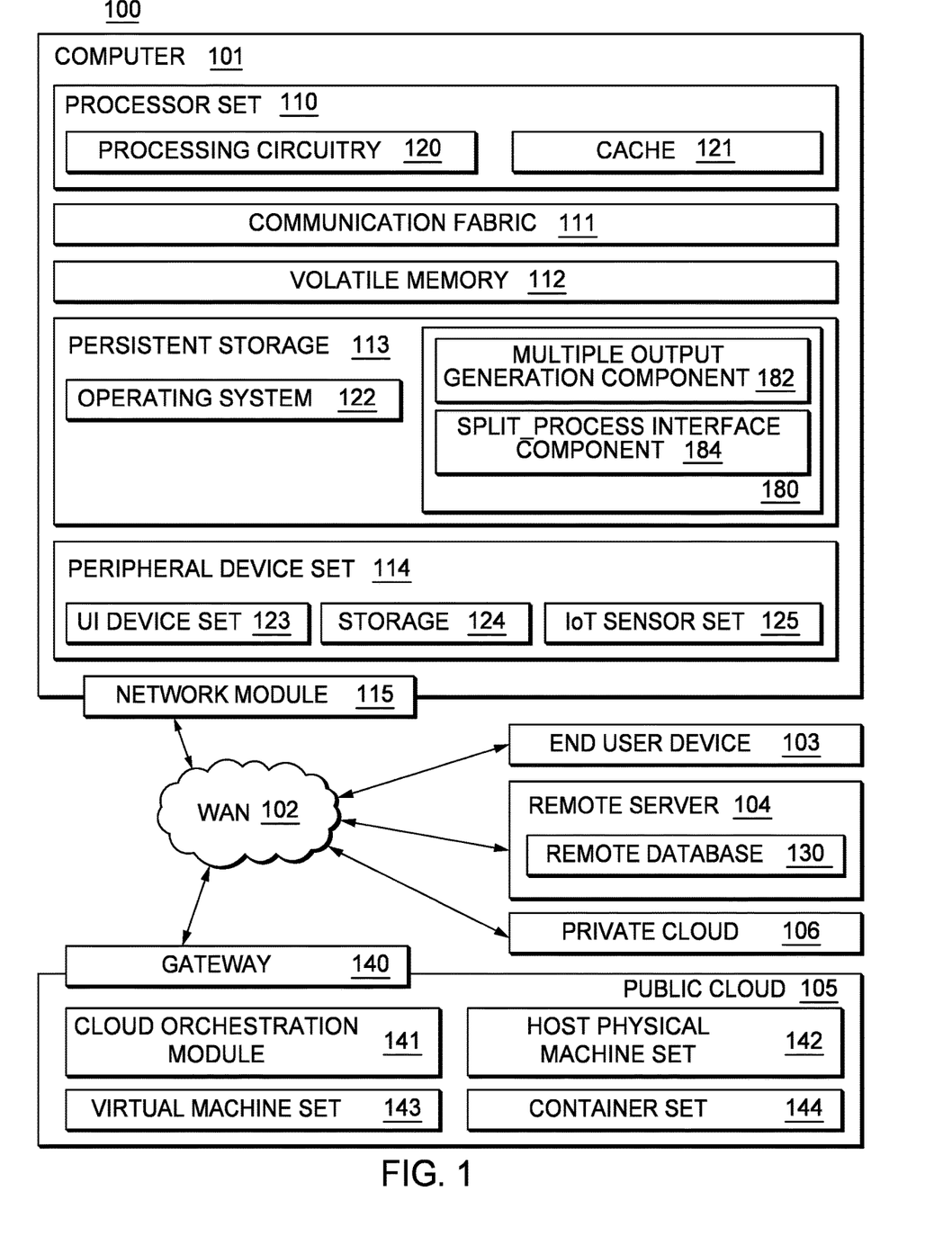
FIG. 1 is a block diagram of an example computer environment for use in conjunction with one or more embodiments for generating multiple outputs that share a common section in a pseudo-random software system.

With reference now to FIG. 1, there is shown an example computing environment 100. Computing environment 100 contains an example of an environment for the execution of at least some of the computer code involved in performing inventive methods for generating multiple outputs that share common sections in a pseudo-random software system at block 180, such as Multiple Output Generation Module 182 and Split_Process Interface Component 184. In addition to block 180, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and block 180, as identified above), peripheral device set 114 (including user interface (UI) device set 123, storage 124, and Internet of Things (IOT) sensor set 125), and network module 115. Remote server 104 includes remote database 130. Public cloud 105 includes gateway 140, cloud orchestration module 141, host physical machine set 142, virtual machine set 143, and container set 144.

Computer 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

Processor Set 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in block 180 in persistent storage 113.

Communication Fabric 111 is the signal conduction path that allows the various components of computer 101 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

Volatile Memory 112 is any type of volatile memory now known or to be developed in the future. Examples include dynamic type random access memory (RAM) or static type RAM. Typically, volatile memory 112 is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

Persistent Storage 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid state storage devices. Operating system 122 may take several forms, such as various known proprietary operating systems or open source Portable Operating System Interface-type operating systems that employ a kernel. The code included in block 180 typically includes at least some of the computer code involved in performing the inventive methods.

Peripheral Device Set 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

Network Module 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN 102 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

End User Device (EUD) 103 is any computer system that is used and controlled by an end user (for example, a customer of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

Remote Server 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

Public Cloud 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

Private Cloud 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

Embodiments of the present disclosure provide new effective techniques enabling accurate and effective generation of the multiple outputs for the same input request, significantly reducing the computation time of the disclosed processes for generating multiple outputs for different generated test cases and avoiding some deficiencies of current systems. The time efficiency of disclosed methods generally stems from using the code generated before operations of generating different test cases start and the generated code is executed only once. In disclosed methods this generated code is duplicated, and used for multiple test generations or multiple plan generations. Therefore, the most saving is achieved when the generated code is duplicated on points far enough from the start of the test or plan generation program requiring significant computational time. A disclosed non-limiting computer implemented test method comprises generating different test or plan cases for at least two different outputs, which originate from a common input. A predefined state or condition of interest is received to identify a split point in a parent process. For example, in processor verification test generation software system, a user input for the predefined state or condition of interest can include a micro-architectural processor state that can require a large computation time to reach during the test case generation. In a plan mapping generation software system, a user input for the predefined state or condition of interest can include a predefined location between different physical locations generating multiple mapping plans with different routes between the different physical locations. When the predefined condition is identified in the parent process, the predefined condition is marked as the split point. A child process is generated including the common section from the input request up to the split point, at least one instruction after the split point, and a randomizer state is changed to add a form or randomization for the child process that enables a different computation path from the parent process after the split point. The child process runs to completion generating one of the respective test cases for different outputs. Multiple different test cases for different outputs can be generated for example generating multiple different child processes. Each generated child process can be saved before generating another child process to minimize memory resources needed for multiple output generation. Otherwise multiple different child process can be generated in parallel using available memory resources. In disclosed methods, the common section is generated only once in the parent process, which significantly improves performance over existing test and plan generation techniques. The method is capable of reacting dynamically to a request (either internal or from a test environment interface) to create a diversion in the process or program flow from a common section. The method is independent of the underlying software system architecture. An operating system running the underlying software must include some mechanism for duplicating an existing process (such as a fork system call in a Linux operating system.)

Figure 2:
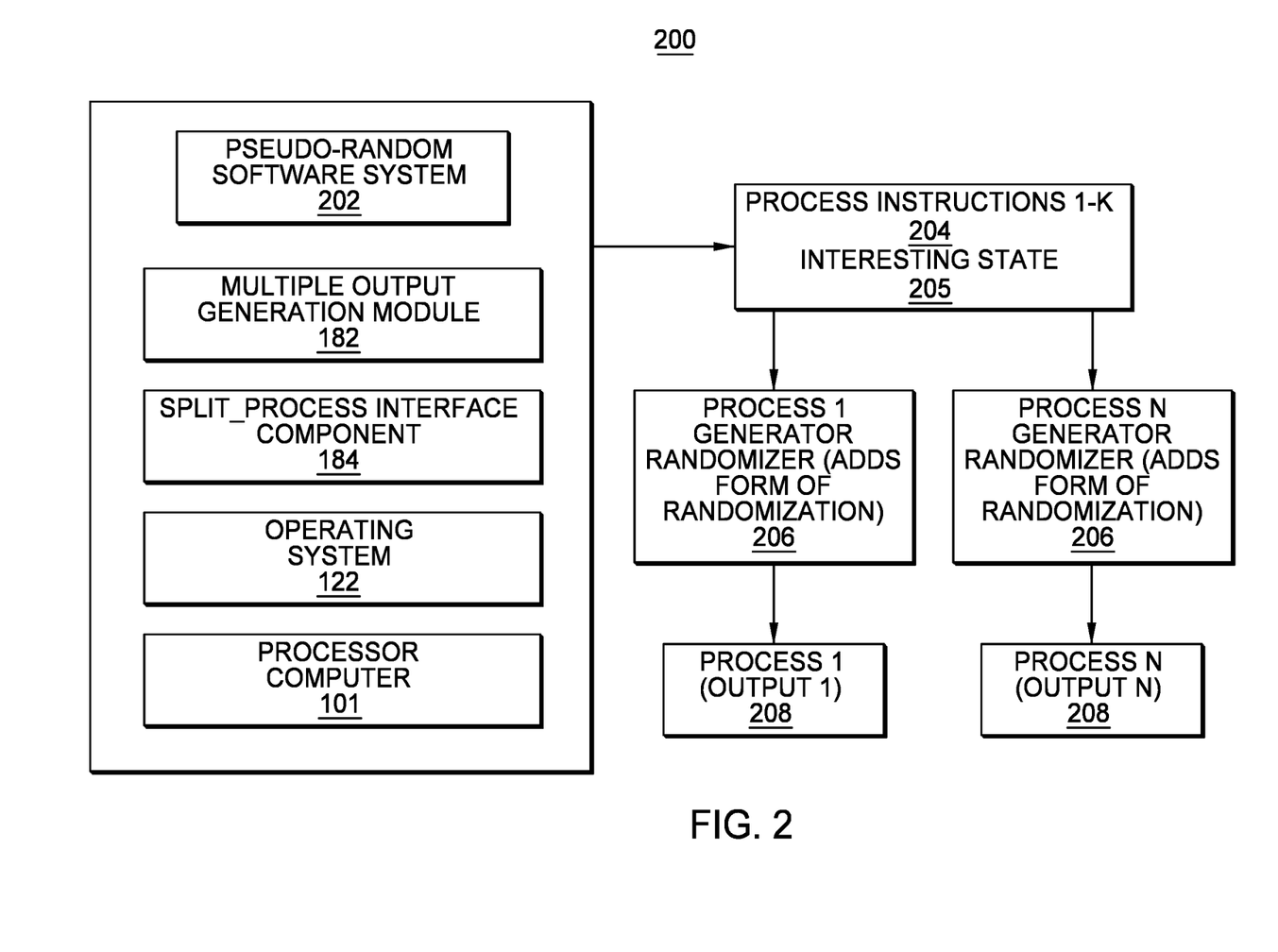
FIG. 2 is a block diagram of an example system for generating multiple outputs for different generated test cases that share a common section in a pseudo-random software system of one or more disclosed embodiments.

Referring now to FIG. 2, there is shown an example system 200 for generating multiple outputs for different generated test cases that share a common section in a pseudo-random software system of one or more disclosed embodiments. System 200 can be used in conjunction with computer 101 and cloud environment of the computing environment 100 of FIG. 1 for process generation of disclosed embodiments. In accordance with disclosed embodiments, system 200 is configured for generating multiple outputs for an input request that share a common section in a pseudo-random software system 202. System 200 includes the Multiple Output Generation Module 182 and the Split_Process Interface Component 184 used together with an operating system 122 and processor computer 101 of the computing environment 100 of FIG. 1 for example, to implement and control operations of methods of disclosed embodiments. System 200 uses the Multiple Output Generation Module 182 and Split_Process Interface Component 184 for generating multiple processes that share a common section to provide respective multiple outputs for different generated test cases or different generated plan cases of disclosed embodiments.

For example, a user can specify a command TestSplit(M) in a test generation system or RunSplit(M) in a plan generation system, marking a split point for an identified state or condition, and a set of instructions or operations after the split point. At the split point, M different test cases or M different plan cases are generated; each includes a common section of the sequence of instructions that are identical up to the split point in the first process, with each test case or plan case having added randomization and a different set of the instructions that follow the split point.

As shown in FIG. 2, the Multiple Output Generation Module 182 and Split_Process Interface Component 184 generate a plurality of Process Instructions 1-K 204 until an interesting state 205 is identified and a split point is marked. The generated Process Instructions 1-K 204 are applied to respective Process Generators 206, 1-N that define the Process Instructions 1-K 204 as a common section of code for each multiple processes 1-N to be generated. The respective Process Generators 206, 1-N change a randomizer state, adding a form of randomization, and at least one instruction after the split point for each of multiple processes 1-N to be generated. Multiple processes 208, 1-N that share the common section provide respective multiple outputs 1-N, where the common section of code is generated only once at block 204.

Figure 3A:
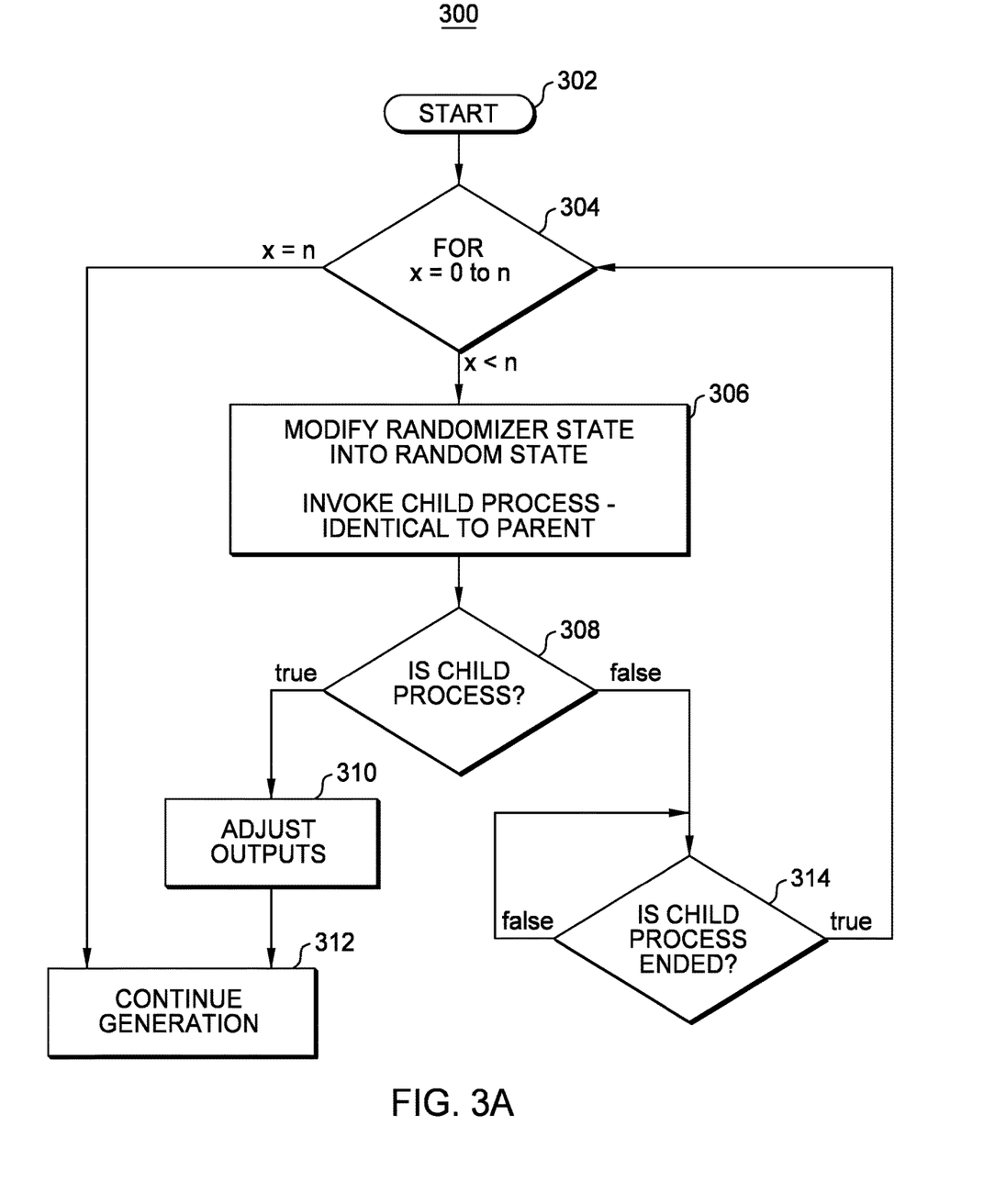
FIG. 3A is a flow chart illustrating example operations of sequentially generating multiple processes that share a common section in a pseudo-random software system to provide respective multiple outputs for different generated test or plan cases of one or more disclosed embodiments.

Referring also to FIG. 3A, example operations are shown of an example computer-implemented method 300 for sequentially generating multiple processes that share a common section of code in a pseudo-random software system to provide respective multiple outputs of one or more disclosed embodiments. Method 300 may be implemented with computer 101 for example, with operations of method 300 controlled by the Multiple Output Generation Module 182 and Split_Process Interface Component 184.

Figure 4:
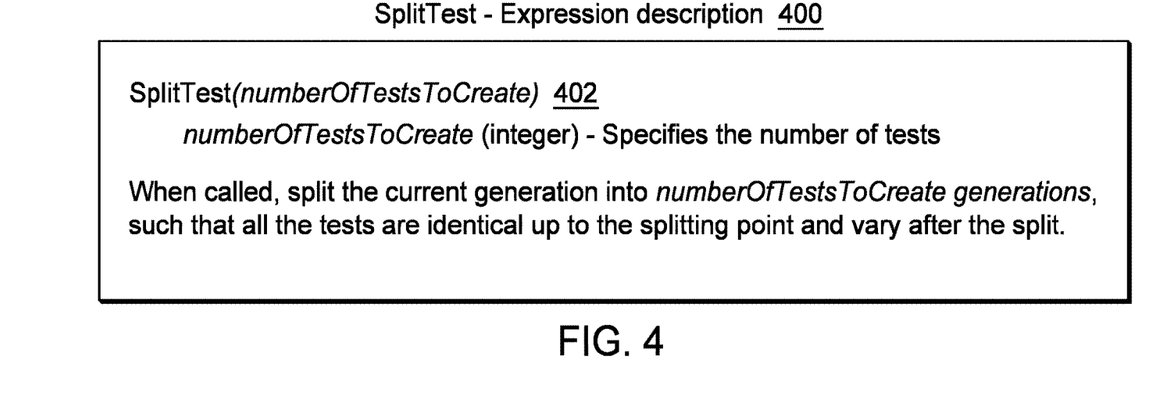
FIG. 4 illustrates an example SplitTest expression description of one or more embodiments of generating multiple outputs that share common sections in a pseudo-random software system.

The Multiple Output Generation Module 182 and Process_Test Interface Component 184 implementing the illustrated example method 300 include capability to support user code, such as a simulation based processor verification test generator where user code is processed in a parent process until an interesting state is identified. For example, Multiple Output Generation Module 182 and Process_Test Interface Component 184 advantageously perform control operations for the method 300 of disclosed embodiment. In some embodiments, the Multiple Output Generation Module 182 and Split_Process Interface Component 184 may be used to provide a TestSplit command, such as illustrated in FIG. 4, for example with an internal decision mechanism for diverging from the common section of code being processed for test generation. For example, Multiple Output Generation Module 182 and Split_Process Interface Component 184 may provide two possible such interfaces that include:

1. A language construct that enables the user to specify where the split from a common section should take place. For example, if the input request is described in some formal language, then a designated statement in the language can have the semantics of splitting the flow into multiple sessions that make different random decisions but otherwise fulfill the same user request.
2. A reactive component that can change the program's behavior based on a predefined set of rules that match against conditions in a test environment or a plan processing environment. In a processor verification embodiment, such conditions may include reaching a predefine processor state (e.g., a specific buffer is full) or a predefined test-generation state (e.g., a number of generated instructions reaches a set threshold.)

Referring also to FIG. 4, an example SplitTest Expression description 400 is shown. As shown, a command SplitTest (numberOfTestsToCreate) 402 is provided with the numberOfTestsToCreate being an integer value that specifies the number of tests to be generated, such as multiple N tests. When the command SplitTest 402 is called, the specified number of tests, such as N test cases are generated, the current test generation process is split into the specified number of test generation cases. Each of the generated M test cases includes a common section of instructions that are identical up to the split point, with each test having added randomization and a different set of the instructions that follow the split point. The common section is generated only once in the current test generation process that is split and used for all test cases, hence providing a significant efficiency improvement. Alternatively, a RunTest(numberOfPlansToCreate) expression similarly can provided with the numberOfPlansToCreate being an integer value that specifies the number of plans to be generated, such as multiple N plans.

As indicated at block 302, operations of the illustrated method 300 start responsive to an interesting condition identified in a parent process. For example, the parent process receives an input request that defines a condition of interest and a number of tests or plans to be generated, such as multiple N tests or N plans, a sequence of instructions and a condition of interest. The input request and the sequence of instructions are processed until a state or condition of interest is reached by the parent process at block 302. For example, the condition of interest is marked as a split point in the parent process at block 302. At a decision block 304, an integer value x of a specified number N of multiple outputs for multiple processes, such as for multiple test or plan generation cases to be generated starts at x=0, where x<N. At block 306, a randomizer state is modified, and a child process is invoked to create a child process identical to the parent process.

For example at block 306, a child process that is identical to a parent process can be created with an operating system, using a fork system call to create a new process from an existing running process. That is, the system call fork( ) performs an operation whereby a process creates a copy of itself and the new process is a child process of the calling parent process.

At a decision block 308, checking is performed to determine if a process is a child process. When determined the process is a child process, generation of the child process continues to adjust the child process output at block 310. At block 310, the child process cleans the output of the child process, for example copies the output test case file to a different directory or renames the child process. As indicated at block 312, generation of the child process continues. At block 312, the child process follows a different computation path from the parent process and the child process runs to completion executing at least one additional instruction, for generating a process that shares a common section of code of the parent process and providing one of multiple processes for respective multiple outputs of one or more disclosed embodiments.

When determined the process is not a child process at decision block 308, checking is performed at a decision block 314 to determine if the child process has ended, i.e., run to completion at block 312 to generate a process output. When determined at decision block 314 that the child process has ended, operations return to decision block 304, where the integer value x is incremented by one, and operations are repeated to create a next child process. This continues for every child process until the requested number of test case processes has been reached.

Figure 3B:
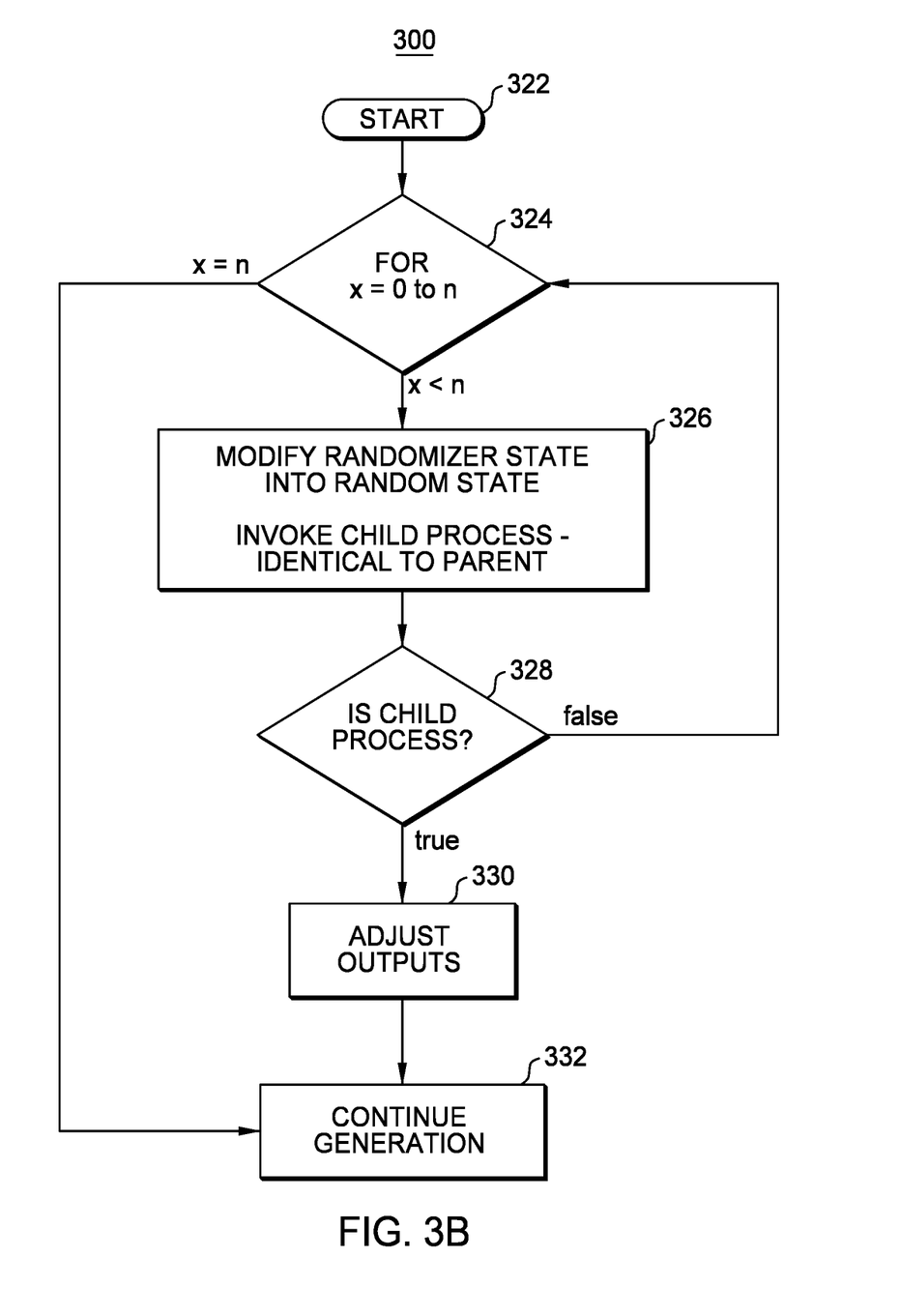
FIG. 3B is a flow chart illustrating example operations of generating multiple processes in parallel that share a common section in a pseudo-random software system to provide respective multiple outputs for different generated test or plan cases of one or more disclosed embodiments.

Referring now to FIG. 3B, example operations are shown of an example computer-implemented method 320 for generating multiple processes in parallel that share a common section of code in a pseudo-random software system to provide respective multiple outputs of one or more disclosed embodiments. Method 320 may be implemented with computer 101 for example, with operations of method 320 controlled by the Multiple Output Generation Module 182 and ProcessTest Interface Component 184.

As indicated at block 322, operations of the illustrated method 320 start responsive to an interesting condition identified in a parent process. At a decision block 324, an integer value x of a specified number N of multiple outputs for multiple processes, such as for multiple test generation or plan generation cases to be generated starts at x=0, where x<N. At block 326, a randomizer state is modified, and a child process is invoked to create a child process identical to the parent process. At a decision block 328, checking is performed to determine if a process is a child process. When determined the process is a child process, generation of the child process continues to adjust the child process output at block 330, As indicated at block 332, generation of the child process continues running to completion and saving the child process output to a different directory or renaming the child process. When determined the process is not a child process, operations return to decision block 324, where the integer value x is incremented by one, and operations are repeated to create a next child process. This continues in parallel for every child process until the requested number of test case processes has been reached.

Figure 5:
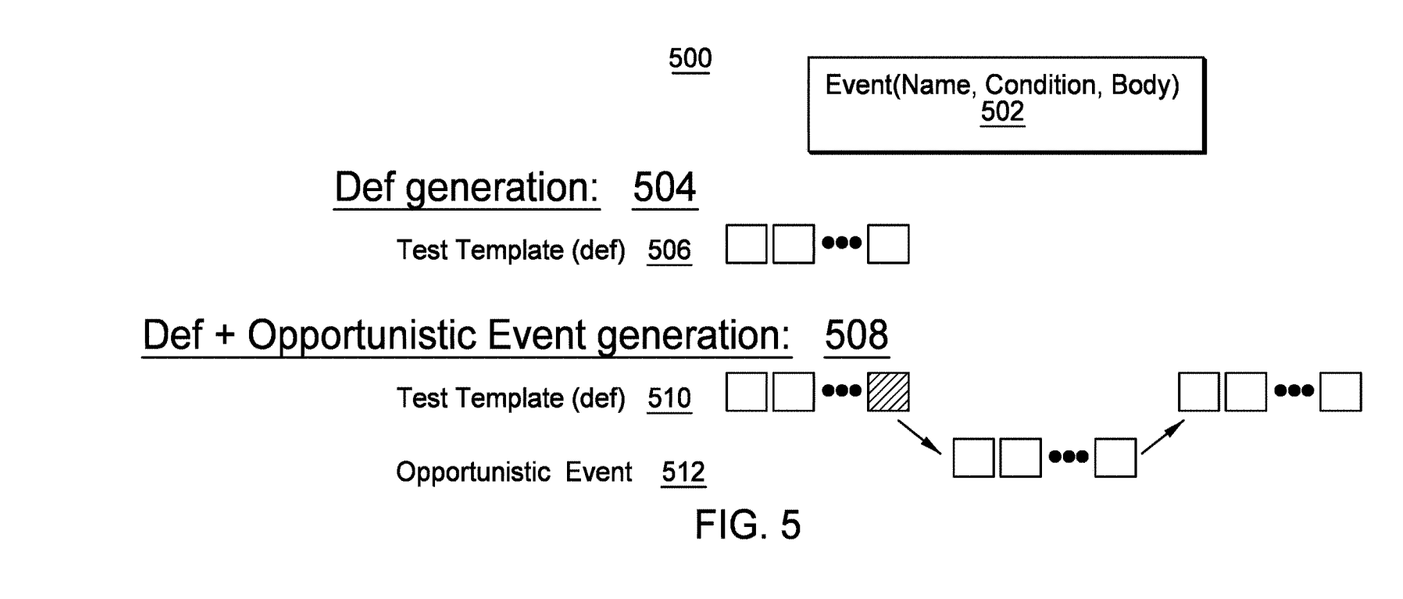
FIG. 5 illustrates an example SplitTest method with an Opportunistic Event of one or more embodiments of generating multiple outputs for different generated test cases that share common sections in a pseudo-random software system.

Referring to FIG. 5, there is shown an example SplitTest generation method 500 with an example Opportunistic Event generation of one or more embodiments of generating multiple outputs that share common sections in a pseudo-random software system. For example, the Opportunistic Event generation includes a SplitTest 402 comprises SplitTest(numberOfTestsToCreate). When called the SplitTest 402 splits the current generation into a specified numberOfTestsToCreate generation, such that all tests are identical up to the splitting point and vary after the split.

For the example SplitTest generation method 500, assume the following pseudo code of a process called def:
1class=All
1class=All
SplitTest(6)
1class=All
Generation of this def will end with six tests, in all six tests, the first two instructions will be identical and the last instruction will be different (e.g., the instruction varies after the split for each of the six tests.)

As shown in FIG. 5, an Event(Name, Condition, Body) 502 includes a user defined Name, Condition, Body. For example, an Opportunistic Event Mechanism 502 for example defined by three major components: a Name of SplitTest, a Condition of user specified condition or state of interest, and a Body used to check if the event condition is true before processing a next instruction. An illustrated def generation 504 includes a Test Template 506, for example that includes a sequence of instructions with relations between the instructions, such as two instruction 1class=All of the above example process def. A Test template (def) defines a sequence of instructions with relations between them.

Next an illustrated def+Opportunistic Event generation 508 includes a Test Template 510, for example that includes a sequence of instructions with an instruction identifying the predefined event before continuing with an Opportunistic Event 512. Each instruction in the sequence of instructions of the Test Template 510 is processed checking if the event condition true before processing a next instruction. As shown, the Opportunistic Event 512 follows a sequence of two instructions of the Test Template 510. The Opportunistic Event 512 can include the command SplitTest that splits the current generation into the specified number of test generations, where all generated tests are identical up to the splitting point and vary after the split. After processing the Opportunistic Event 512 operations return to the Test Template 510 and continue to run the test generation operations to completion.

Figure 6:
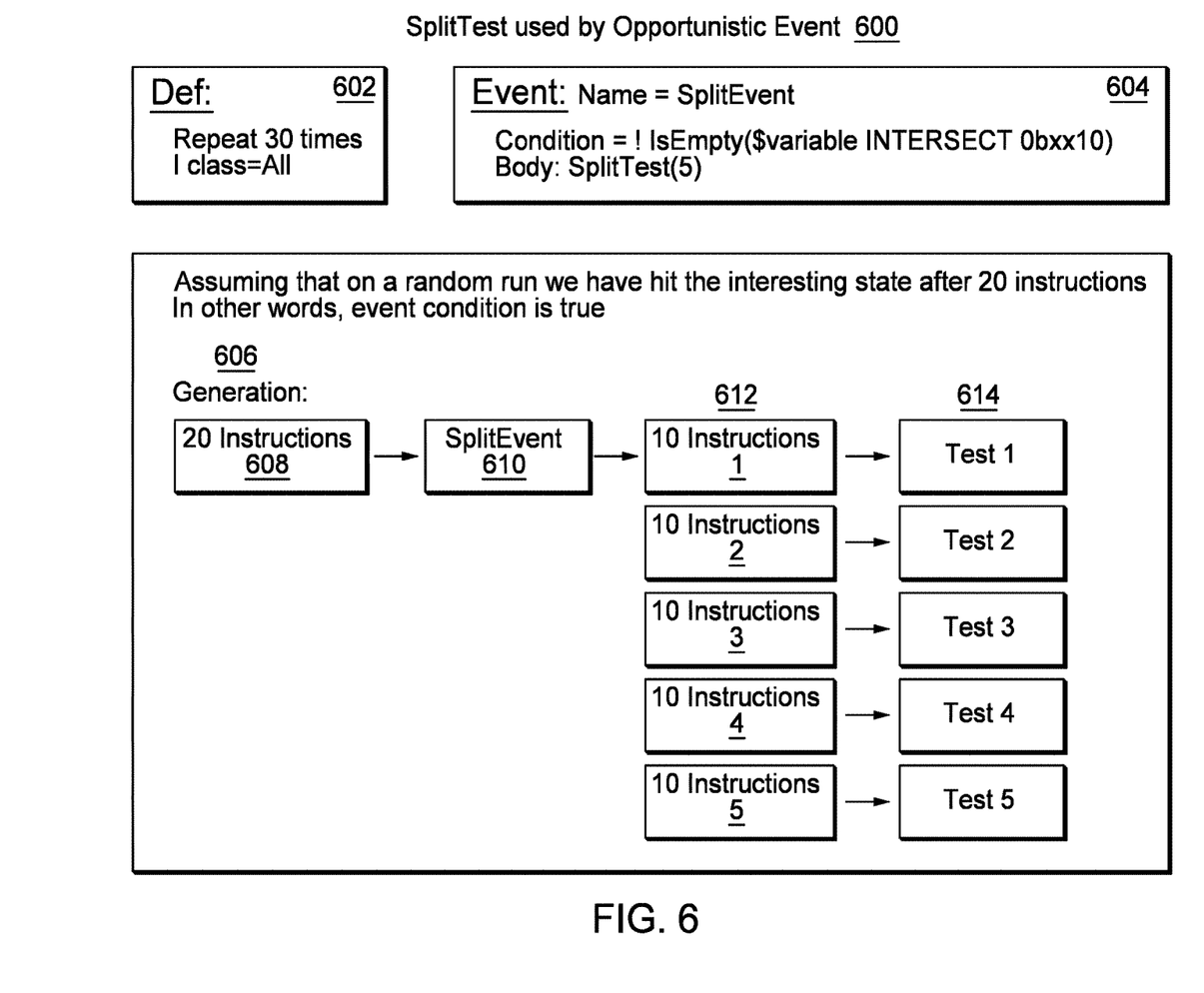
FIG. 6 illustrates a SplitTest example method used by Opportunistic Event named SplitEvent of one or more embodiments of generating multiple outputs for different generated test cases that share common sections in a pseudo-random software system.

Referring to FIG. 6, there is shown example SplitTest operations 600 used by Opportunistic Event of one or more embodiments of generating multiple outputs for different generated test cases that share common sections in a pseudo-random software system. FIG. 6 illustrates an example non-limiting computer implemented test method that comprises generating a sequence of instructions defined by one or more user requests to identify a predefined state or condition. The user specifies an event named SplitEvent for marking a split point for the identified state or condition, followed by another set of instructions. For example, with a SplitEvent (M), M test cases are generated, each includes a common section of instructions that are identical up to the split point, with each test having a different set of the instructions that follow the split point. The common section is generated only once and used for all test cases, as a result providing a significant efficiency improvement over existing test generation techniques. This method provides desired test cases with minimal effort, reducing required test resources and test generation time and significantly improving performance over existing test generation techniques.

As shown at block 602, for example a user test template is defined to repeat an instruction 1class=All 30 times. As shown at block 604, an Opportunistic Event 604 includes a Name of SplitTest, a Condition=! IsEmpty($variable INTERSECT 0bxx10), which can include any user specified condition or state of interest, and a Body: SplitTest(5). Opportunistic Event 604 checks if the event condition is true before processing a next instruction in a sequence of instructions being processed. Assuming in a random test run at block 602, the interesting state is hit after 20 instructions. A test generation 606 includes at block 608 the 20 instructions followed by the SplitEvent 610. The SplitEvent 610 adds a form of randomization and provides a respective different 10 instructions for each of five (5) of tests being generated as indicated at respective blocks 612, 1-5. At respective blocks 614, a respective generated test case includes the 20 instructions of block 608, the randomization added by SplitEvent 610, and the respective different 10 instructions of blocks 612. The generated test cases can be used for testing various hardware systems.

Each of the respective generated test cases 614, 1-5 for example, when generated in a processor verification test generation software system can be used for various hardware processor verification testing applications.

Figure 7:
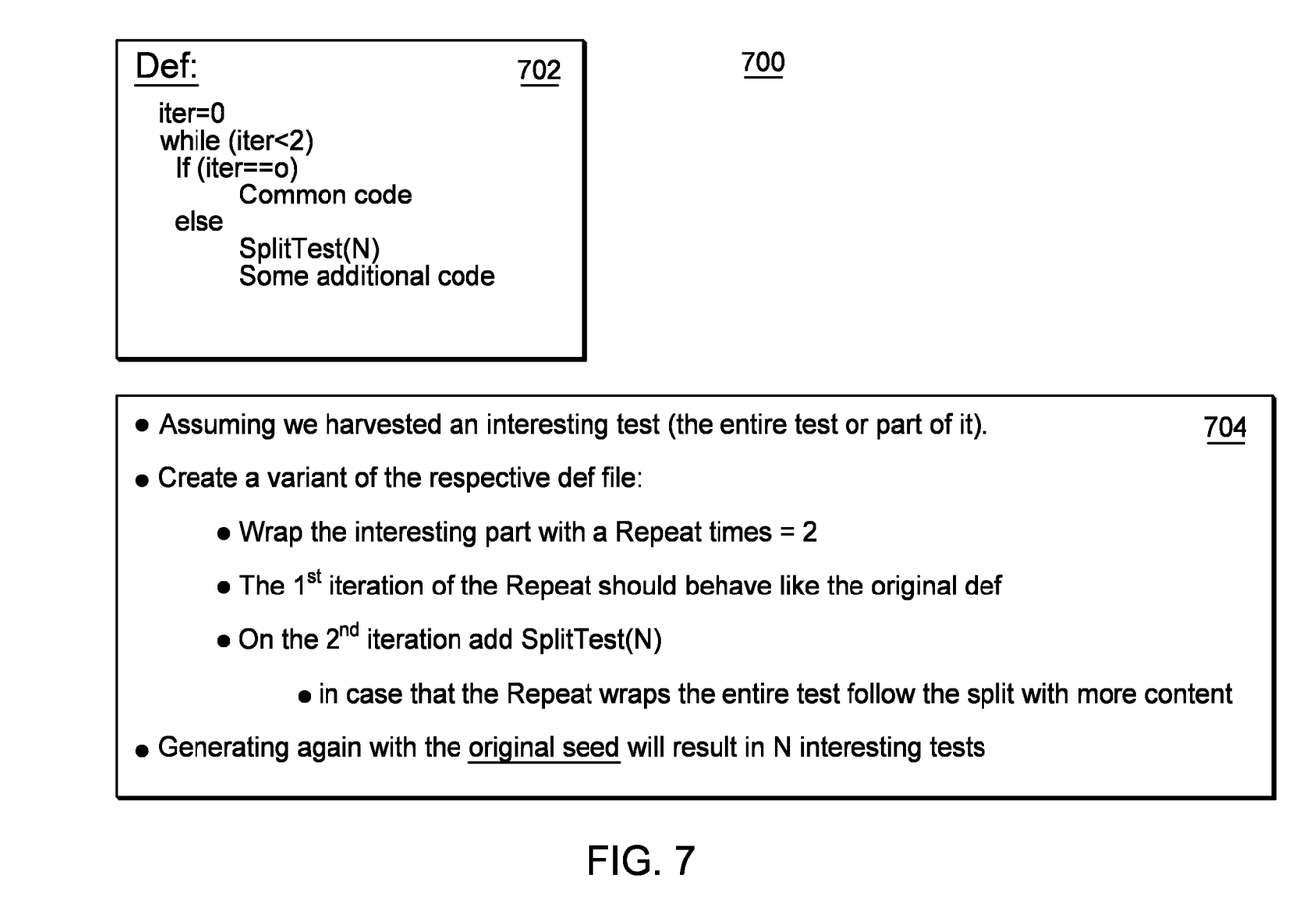
FIG. 7 illustrates another example SplitTest method of one or more embodiments of generating multiple outputs for different generated test cases that share common sections in a pseudo-random software system.

Referring to FIG. 7, there is shown another example SplitTest method 700 of one or more embodiments of generating multiple outputs for different generated test cases that share common sections in a pseudo-random software system. The SplitTest method 700 enables creating multiple tests, such as multiple N tests of the command SplitTest(N) using results of a completed first test generation, for example, common-code results of (iter=1). SplitTest method 700 can generate a desired result of multiple N interesting tests with minimal effort.

As indicated in FIG. 7 at block 702, an example pseudo code generation called def is provided. As indicated at block 704, assuming an interesting test is generated or harvested (such as the entire test or a part of the test), a variant of the respective def file is created such as Def: 702 and listed above. For example, creating a variant of the def file includes: Wrap the interesting part with a Repeat times=2, the first iteration of the Repeat should behave like the original def, and on the second iteration of the Repeat SplitTest(N) is added. When the Repeat wraps the entire test and the SplitTest(N) follows with more code. Generating another interesting test with the original seed results in N interesting tests.

Figure 8:
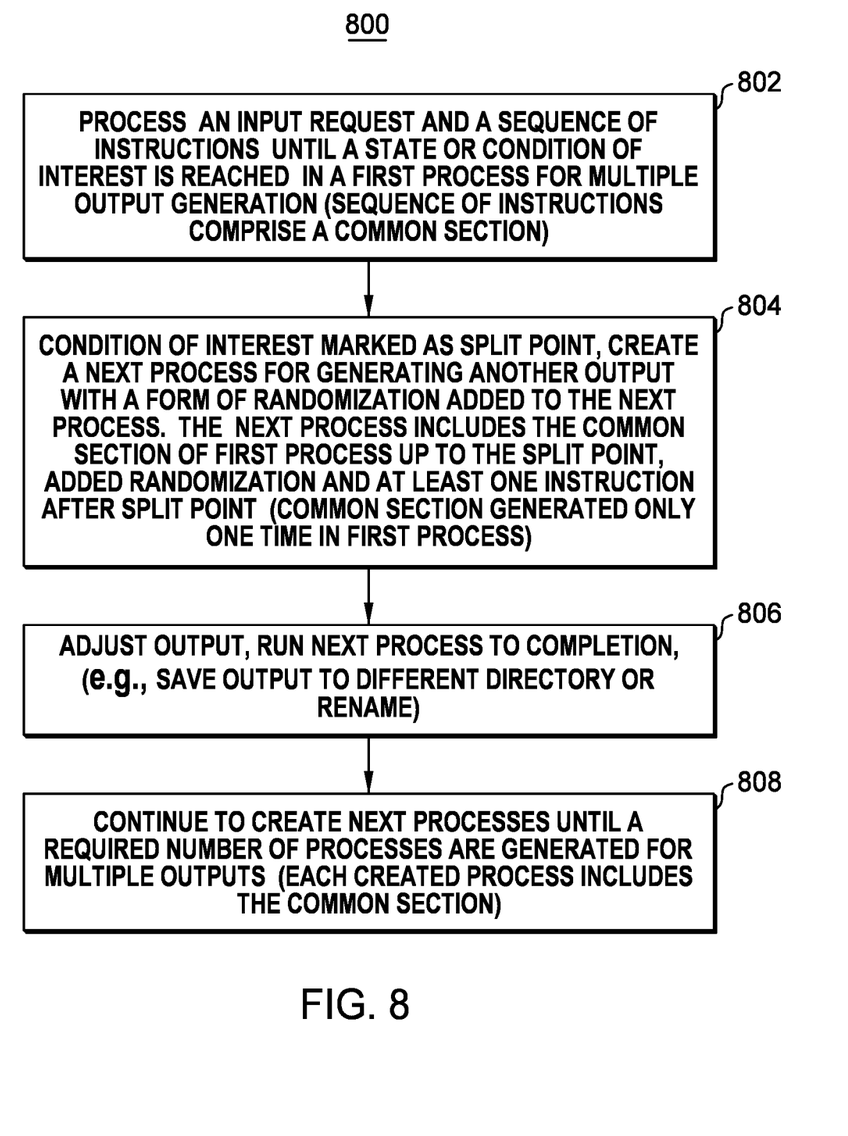
FIG. 8 is a flow chart illustrating example system operations of one or more embodiments of generating multiple outputs for different generated test cases, and different generated plan cases that share common sections in a pseudo-random software system.

Referring to FIG. 8, there is shown a flow chart of a method 800 illustrating example system operations of one or more embodiments of generating multiple outputs for different processes or generated test cases that share a common section in a pseudo-random software system. The disclosed non-limiting example computer-implemented method 800 comprises processing an input request and a sequence of instructions or operations until a state or condition of interest is identified in a first process for multiple output generation at block 802. At block 804, the identified condition of interest is marked as a split point in the first process. At the split point, a next process is generated or created to include a common (shared) section of the first process from the input request to the split point, an added form of randomization, and at least one instruction after the split point. At block 806, an output of the generated process is adjusted, (such as, renamed or saved to a different directory) to avoid conflict with the parent process and additional generated process with the process running to completion. At block 808, operations continue with creating next processes to provide a requested number of processes for the multiple outputs, with each generated process including the common section. The common section is generated only once in the first process at block 802, whereby method 800 can provide significantly enhanced performance for generation of multiple tests or plans over existing systems. This method does not require computation time for separately processing the shared common section by each process generating a respective multiple output of existing systems. This method is independent of the architecture of an underlying pseudo-random software system that has an operating system capable of duplicating an existing process.

While the foregoing is directed to embodiments of the present invention, other and further embodiments of the invention may be devised without departing from the basic scope thereof, and the scope thereof is determined by the claims that follow.

What is claimed is:

1. A method comprising:
processing an input request and a sequence of instructions until a condition of interest is identified in a first process, the input request defines the sequence of instructions and the condition of interest;
marking the condition of interest as a split point in the first process;
generating a next process for a next output, the next process comprises a common section of the sequence of instructions of the first process from the input request to the split point, an added form of randomization, and at least one instruction after the split point; wherein the common section is provided in the first process; and
adjusting the next process output and running the next process to completion to generate a process output in a pseudo-random software system.

2. The method of claim 1, further comprising:
repeating the generating a next process for a next output to provide a requested number of processes for multiple outputs and saving a next process output for each next process.

3. The method of claim 1, further comprising:
receiving a user specified command defining a number M of test cases to be generated; and for each test case, providing the common section of the sequence of instructions of the first process from the input request up to the split point, and a different set of instructions after the split point for each next process, and saving a process output for each test case in the pseudo-random software system, wherein the pseudo-random software system comprises a pseudo-random software test generation system.

4. The method of claim 1, further comprising:
receiving a user specified command defining a number M of process cases to be generated and providing the common section of the sequence of instructions of the first process from the input request up to the split point, and a different set of instructions after the split point for each next process, and saving a process output for each next process in the pseudo-random software system.

5. The method of claim 1, wherein generating a next process comprises changing a randomizer state to provide the added form of randomization for providing a different computation path for the next process.

6. The method of claim 1, wherein generating a next process comprises duplicating the first process, adding the form of randomization to provide a different computation path for the duplicated process, and the at least one instruction after the split point.

7. The method of claim 1, further comprises generating a requested number of processes for generating multiple outputs, wherein each process comprises the common section of the first process from the input request to the split point, and each process comprises a different computation path from other processes following the split point, and a different saved output for each process.

8. The method of claim 1, further comprises identifying a generated test case as an interesting test, wrapping the identified interesting test case with a given command, processing a first iteration of the given command to provide a common code for the interesting test case, and processing the common code for a second iteration of the given command, adding a user specified command defining a number M of process cases to be generated and at least one additional instruction for generating each of M different interesting tests.

9. The method of claim 1, wherein identifying a condition of interest in a first process further comprises defining an Opportunistic event injection, the Opportunistic event injection comprises a user specified command, and calling the user specified command to split the current process at a split point and generate M processes, each process being identical up to the split point and different after the split point.

10. The method of claim 1, wherein running the next process to completion further comprises saving the generated process output with a different output name for each generated process output.

11. A system, comprising:
one or more processors; and
a memory containing a program which when executed by the one or more processors performs an operation, the operation comprising:
processing an input request and a sequence of instructions until a condition of interest is identified in a first process, the input request defines the sequence of instructions and the condition of interest;
marking the condition of interest as a split point in the first process;
generating a next process for a next output, the next process comprises a common section of the sequence of instructions of the first process from the input request to the split point, an added form of randomization, and at least one instruction after the split point; wherein the common section is provided in the first process; and
adjusting the next process output and running the next process to completion to generate a process output in a pseudo-random software system.

12. The system of claim 11, further comprising:
repeating the generating a next process to provide a requested number of processes for multiple outputs and saving a next process output for each next process.

13. The system of claim 11, further comprising:
receiving a user specified command defining a number M of test cases to be generated and the condition of interest for marking the split point for generating a test case, and providing the common section of the sequence of instructions of the first process from the input request up to the split point, and a different set of the instructions that follow the split point for each test case.

14. The system of claim 11, wherein generating a next process comprises changing a randomizer state to provide the added form of randomization for providing a different computation path from the first process.

15. The system of claim 11, wherein generating a next process comprises duplicating the first process and adding randomization to provide a different computation path for the duplicated process, and the at least one instruction after the split point.

16. A computer program product for generating multiple outputs that share a common section in a pseudo-random software system, the computer program product comprising:
- a computer-readable storage medium having computer-readable program code embodied therewith, the computer-readable program code executable by one or more computer processors to perform an operation comprising:
- processing an input request and a sequence of instructions until a condition of interest is identified in a first process, the input request defines the sequence of instructions and the condition of interest;
- marking the condition of interest as a split point in the first process;
- generating a next process for a next output, the next process comprises a common section of the sequence of instructions of the first process from the input request to the split point, an added form of randomization, and at least one instruction after the split point; wherein the common section is provided in the first process; and
- adjusting the next process output and running the next process to completion to generate a process output.

17. The computer program product of claim 16, wherein the computer-readable program code is further executable to perform the operation further comprising:
- repeating generating a next process for a next output, to provide a requested number of processes for multiple outputs, and saving a next process output for each next process.

18. The computer program product of claim 16, wherein generating a next process for a next output, comprises duplicating the first process and adding randomization to provide a different computation path after the split point for the duplicated process.

19. The computer program product of claim 16, wherein generating a next process for a next output, comprises generating at least one child process, adding randomization and at least one additional instruction to each child process, and adjusting an output of each child process.

20. The computer program product of claim 16, wherein processing an input request and a sequence of instructions until a condition of interest is identified in a first process comprises processing a user specified test template defining the sequence of instructions and checking for a user defined condition of interest before processing each instruction in the sequence of instructions.

* * * * *